July 30, 1940. J. H. SHAPLEIGH Re. 21,521

PROCESS FOR CATALYTIC REACTION Orig. 2,173,98

Original Filed Aug. 30, 1937 2 Sheets-Sheet 1

JAMES H. SHAPLEIGH
INVENTOR
BY Edward B. Beck
ATTORNEY

July 30, 1940. J. H. SHAPLEIGH Re. 21,521

PROCESS FOR CATALYTIC REACTION

Original Filed Aug. 30, 1937 2 Sheets-Sheet 2

JAMES H. SHAPLEIGH
INVENTOR
BY Edward B. Beale
ATTORNEY

Reissued July 30, 1940

Re. 21,521

UNITED STATES PATENT OFFICE 21,521

PROCESS FOR CATALYTIC REACTION

James H. Shapleigh, Wilmington, Del., assignor to Hercules Powder Company, Wilmington, Del., a corporation of Delaware Original No. 2,173,984, dated September 26, 1939, Serial No. 161,715, August 30, 1937. Application for reissue March 29, 1940, Serial No. 326,824

10 Claims. (Cl. 23—212)

Figure 1:
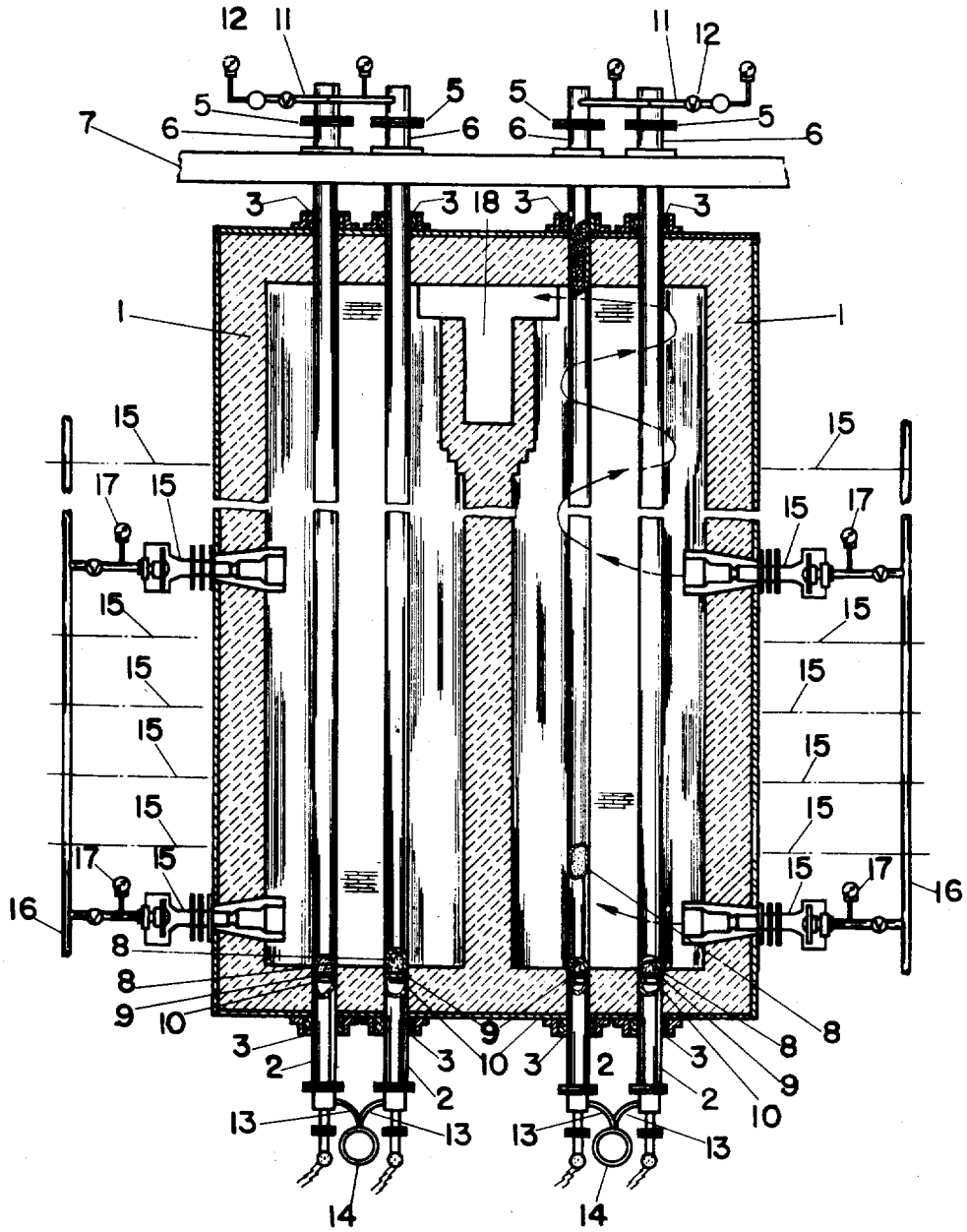

This invention relates to improved apparatus and process for catalytic reactions involving the application of heat to gases and vapors, particularly adapted to the art of producing gas rich in free hydrogen from hydrocarbon gas with steam or other compounds containing oxygen, which may react with the carbon of the hydrocarbons.

In reacting hydrocarbon gases with steam to produce hydrogen, it is desirable to use high temperatures, e. g., up to 2000° F. Although special metal tubes, filled with catalyst, are known to the art, the economical use of such tubes and catalyst has not yet been disclosed. To prevent tubes heated to temperatures of 1600–2000° F. from failing, special methods have heretofore been used, due to the fact that combustion temperature in the heating furnace may be of the order of 3500° F., a temperature higher than the melting point of the alloy steel tubes used.

One of the special methods of heating heretofore known is to apply parallel flow, whereby combustion gases of the highest temperature contact the coolest portion of the reaction tube. Such a method sends gases from the furnace at its base at a very high temperature, since the lower end of the tubes may be as high as 2000° F., and with an endothermic reaction it is obviously necessary to have the supply of heat such that a temperature gradient can be maintained. An additional protective measure sometimes used by the prior art, even with the use of parallel flow, has been the spacing of the reaction tubes at substantial distances one from the other so as to provide considerable room for the combustion gases within the furnace. An example of such spacing is to have the distance from tube center to tube center equal to approximately nine tube diameters.

Another special method heretofore in use has been the use of high proportions of excess air in the combustion gases, in order to reduce the temperature of the gases to a suitable point.

All of the above special methods are uneconomical in use, in that they tend to low thermal efficiency and require, for economy, recovery of excess or waste heat or the use of waste heat boilers or the like.

In all of the above cases, where parallel flow exists between process gas within the tube and hot combustion gas without, the objective has been to obtain safe mechanical and physical conditions. For example, a combustion gas of a temperature of about 3500° F., passing parallel to a tube with maximum end temperature of about 2000° F., must leave the apparatus at a temperature higher than 2000° F., say 2250° F. to 2500° F. Under this condition, the exit temperatures are all below the melting point of the alloy tube. The thermal efficiency is then about 28–35%, a very low value. In addition, the temperature differential for heating the hot end of the tube and furnace wall is low, 500° F. maximum at 28% thermal efficiency. The construction and design of such old apparatus necessitates a substantial temperature difference (250° F.–500° F.) between the furnace wall and the metal tube, making high operating temperature difficult to obtain. It is therefore evident that the old apparatus design, including provision for parallel flow, represents a common and specific state in the art and one not meeting the demand for cheap hydrogen.

I have found that I may use counter-current flow with the combustion gases containing a minimum of excess air, and by the use of high temperature combustion gases, without endangering the metal alloy catalyst tubes. Such I accomplish by the use of a heating furnace containing the catalyst tubes hereinafter more fully described.

When starting with the same gas at 3500° F. I obtain an exit gas of approximately 1300° F., or an efficiency of about 63%, in marked contrast to the 28–35% obtained by parallel flow. My use of from 1 to 10 square feet of parallel refractory wall surface radiating to each square foot of metal tube surface within the furnace, say 2 to 6, I find enables me to utilize small differences between metal tube and refractory wall temperature at the hottest point of the tube. This temperature difference may be 50° F. or less, depending upon the relationship used. This is in contrast to 250° to 500° F. by the disclosed art. Further, I find I can use a high differential (1000° to 1500° F.) between combustion gas and refractory wall at the process gas exit end of the apparatus, without any detrimental effect on the metal tube, even though its melting point is substantially below the combustion gas temperature.

Also, in my furnace I use counterflow heating, with a defined relationship between combustion gas and metal tube surface, e. g., when using a natural gas containing approximately 80% methane and 20% ethane, I prefer to use, per lineal foot of furnace height, about 10 to about 100 cubic feet of gas per hour per square foot of metal tube wall contained within that unit foot of vertical height, with spatial velocity of cracking gas about 600 cubic feet per hour per cubic foot of catalyst. I contemplate the use of suitable burners, hereinafter more fully exemplified, at a number of different levels for a multiple tube furnace, and I also contemplate passing burner gases initially substantially tangentially to the tubes, the gases thus producing a circulatory motion as they pass counter-current to the tubes.

My improved apparatus enables not only higher thermal efficiency to be obtained, but higher chemical efficiency. This is due to the fact that the tube wall temperature can be very close to the refractory wall temperature, and for any specified thermal efficiency for the furnace, as compared to a parallel flow operated furnace, the tube operating temperatures will be higher, which gives directly higher chemical efficiency.

My invention will be more fully understood by reference to the accompanying drawings, which illustrate one form of apparatus suitable for my invention. The drawings are, Figure 1, an elevation, and Figure 2, a plan of apparatus constructed according to the present invention.

Figure 2:
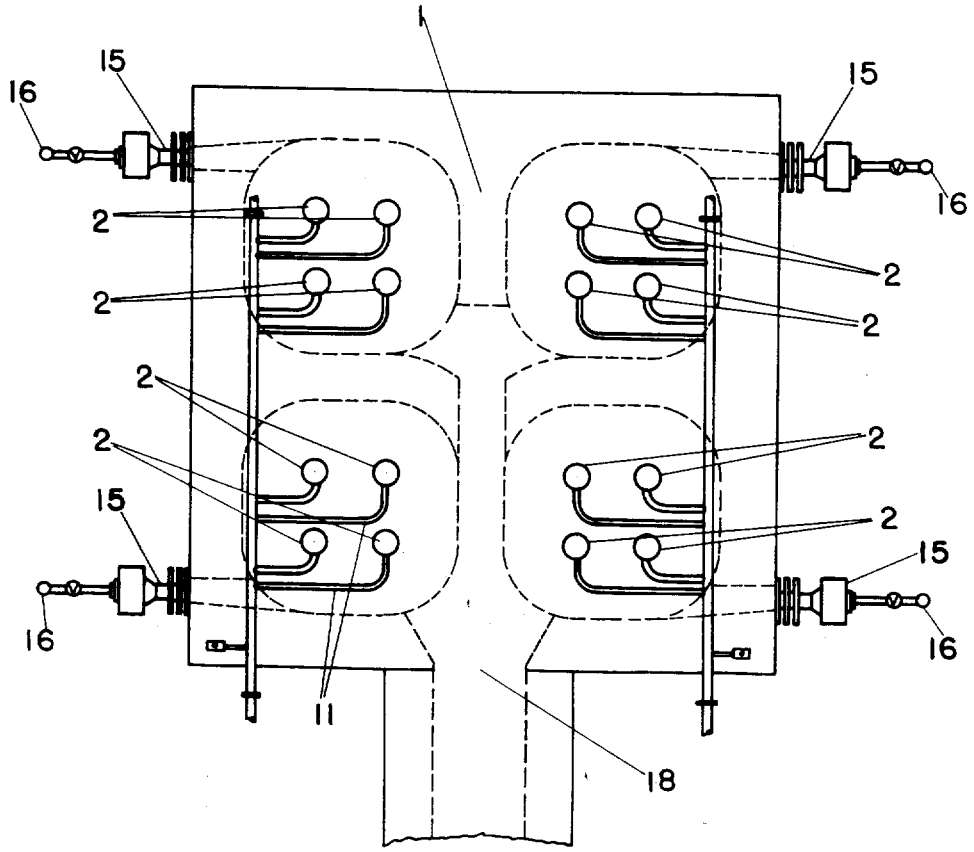

Referring now particularly to Figure 1 of the accompanying drawings, 1 represents a furnace, constructed preferably of fire brick, containing metal alloy catalyst tubes 2, placed vertically in planes parallel to the side walls of the furnace. Any number of such tubes may be used, arranged, for example, as is more fully described in connection with Figure 2. The tubes are constructed of a nickel-chromium-iron alloy adapted to withstand high temperatures. The tubes 2 project through the top and bottom of the furnace, passing through tiles 3. The projecting ends of the tubes and the outer surface of the furnace may, if desired, be covered with insulating material (not shown to enhance clarity). Tubes 2 are supported by means of any suitable support at the top of each tube, e. g., the upper flange 5 of tube 2 rests upon a short collar 6, through which tube 2 may pass freely. Collar 6 is supported by and fastened to steel beam 7, supported in any suitable manner upon the furnace housing. Any of tubes 2 may be readily removed from the furnace by disconnecting it at the flange and lifting it vertically from the furnace.

Tubes 2 are filled with a suitable catalytic material 8, supported by a perforated alloy plate 9. Suitable catalysts are hereinafter disclosed. Plate 9 is removable, and rests upon support 10, attached to the inner surface of the tube. The tubes 2 may be removed and replaced, even when filled with catalyst, in the manner already described, and the catalyst may be placed in the tubes, or removed therefrom, both while the tubes are in the furnace or at other places remote from the furnace.

The gases or vapors are supplied through convenient pipes, which may differ from those shown in the accompanying drawings as circumstances and process may require. In the present example, a mixture of hydrocarbon gas and steam is forced through line 11, controlled by valve 12, into tubes 2.

The gases leaving the bottom of tubes 2 pass through separate lines 13 into headers 14, suitably supported (not shown) and free to move with expansion and contraction of tubes 2.

Burners 15, not all shown in detail, are located in the side wall of furnace 1 at various levels. Suitable burners are those giving a short flame, such as inspirator type N571–A, made by the Surface Combustion Corporation. Gas is supplied to the burners through gas pipes 16, the pressure being indicated by gauge 17. The combustion gases from the burners pass into the furnace substantially tangentially to tubes 2, and pass upward around the tubes with a circulatory motion, at the same time heating the inner surface walls to a high temperature and radiating heat from said walls to tubes 2. The gases of combustion finally escape from the furnace in a flue 18, connecting with a stack (not shown). Suitable heat exchange equipment or waste heat boilers may be used to recover heat remaining in said flue gas.

In the present process, a mixture of steam and hydrocarbon gas is passed down through pipes 2 and through catalyst mass 9, where it is heated rapidly to a temperature of about 1600° to about 2000° F. At such temperatures there is a marked decrease in the strength of alloys used for the catalyst tubes, and serious bending and distortion occur if said tubes are supported at the bottom. Suspension of the tubes at the top, leaving the bottom and connections thereto free to move with thermal expansion of the tube, prevents this distortion.

In the preferred embodiment of my invention, I employ a furnace, each chamber of which contains catalyst tubes having the herein defined relation of tube surface to vertical wall surface, preferably about 3 inches to about 8 inches in diameter, but not exceeding 12 inches in diameter, and preferably about 25 feet long, but not exceeding 50 feet in length. It will be observed that, in my improved furnace, the hydrocarbon gases flow counter to the combustion gases, and very high temperature combustion gases flow against a very hot tube, and, by means of burners placed at various levels the temperature of the various zones is controlled as desired, at high velocity of combustion gases flowing counter-current to the hydrocarbon gas.

Suitable catalysts for the production of hydrogen by cracking hydrocarbon gases possess high activity and physical strength, and shrink very little at the operating temperatures employed. Oxides or metals of the iron group, admixed with aluminum oxide, form desirable catalysts. Calcium and magnesium oxides and silica may be added to produce catalysts of greater strength at high temperatures. Phosphoric acid with alumina and nickel oxide produce a very active catalyst, which shrinks very little at high temperatures. A particularly suitable catalyst is prepared from nickel oxides, magnesia and kaolin. The catalyst is usually prepared in the form of a paste, cut into small cubes, dried slowly, then heated slowly in the presence of steam to a temperature of about 500° F. higher than the operating temperature at which it is to be used, then held at this temperature for about 24–48 hours. Such roasting treatment causes most of the shrinkage to take place before use of the catalyst. Dried catalyst may also be charged into the tubes, and the final roasting step then performed with the tubes in place in the furnace, additional catalyst being added to make up for shrinkage. The catalyst should not be roasted at so high a temperature as to cause serious decrease in catalytic activity.

I prefer to use a catalyst in my furnace comprising diaspore impregnated with nickel nitrate so as to contain about 6% by weight of nickel, and heating to about 500° F. to decompose the nitrate, then reduced by passing therethrough hot reducing gases. Preferably, my catalyst mass comprises particles from about ⅜" to about ⅝" in diameter.

The exist gas from the cracking of methane and steam consists almost entirely of hydrogen, carbon oxides, and excess steam, usually containing a high percentage of carbon monoxide. The gas may be cooled immediately after leaving the furnace, if a hydrogen-carbon monoxide mixture is desired for the production of synthetic alcohol, or, if a gas containing almost entirely hydrogen is desired, it is preferable to pass the exist gas, with added steam over iron oxides or other suitable catalyst in the known manner, for conversion of carbon monoxide to carbon dioxide, then cool the gas, scrub out the carbon dioxide by known means, leaving a hydrogen of about 95% purity.

My apparatus may be operated at any desired pressure above or below atmospheric, limited only by strength of materials at the operating temperature employed.

What I claim is:

1. A process for preparing hydrogen which comprises passing reactants comprising gaseous hydrocarbons and steam downwardly through elongate vertical tubes contained in a heating zone, simultaneously heating said reactants indirectly by introducing hot flaming gases into said heating zone at a plurality of vertically spaced points along and adjacent to said tubes and substantially tangentially to said tubes, and withdrawing the resulting combustion gases at a point adjacent the top of said zone, whereby said flaming gases follow an upwardly ascending rotary path around said tubes, which are thereby uniformly heated without substantial flame impingement thereon.

2. A process for preparing hydrogen which comprises passing reactants comprising gaseous hydrocarbons and steam downwardly through elongate vertical catalyst tubes contained in a heating zone, heating said reactants indirectly by introducing hot combustion gases into said heating zone at a plurality of vertically spaced points along and adjacent to said tubes and substantially tangentially to said tubes, withdrawing the treated reactants from adjacent the bottom of the said tubes and withdrawing the combustion gases at a point adjacent the top of said heating zone, whereby said hot combustion gases follow an upwardly ascending rotary path around said tubes, which are thereby uniformly heated without substantial flame impingement thereon.

3. A process for preparing hydrogen which comprises passing reactants comprising gaseous hydrocarbons and steam downwardly through a bank of substantially vertically disposed catalyst tubes contained in a heating zone, heating said reactants indirectly by introducing hot combustion gases into said heating zone substantially tangentially to said bank of tubes and at a plurality of vertically spaced points along and adjacent to said bank, withdrawing the treated reactants from adjacent the bottom of the tubes and withdrawing combustion gases at a point adjacent the top of said heating zone whereby said hot combustion gases follow an upwardly ascending rotary path around said bank of tubes, which is thereby uniformly heated without substantial flame impingement thereon.

4. A process for preparing hydrogen which comprises passing reactants comprising gaseous hydrocarbons and steam downwardly through a bank of substantially vertically disposed catalyst tubes contained in a refractory-walled heating zone, maintaining a ratio of from 1 to 10 square feet of refractory wall surface to each square foot of catalyst tube surface, heating said reactants indirectly by introducing hot combustion gases into said heating zone substantially tangentially to said bank of tubes and at a plurality of vertically spaced points along and adjacent to said bank, withdrawing the treated reactants from adjacent the bottom of the tubes and withdrawing combustion gases at a point adjacent the top of said heating zone, whereby said hot combustion gases follow an upwardly ascending rotary path around said bank of tubes, which is thereby uniformly heated without substantial flame impingement thereon.

5. A process for preparing hydrogen which comprises passing reactants comprising gaseous hydrocarbons and steam downwardly through a bank of substantially vertically disposed catalyst tubes contained in a refractory-walled heating zone, maintaining a ratio of from 2 to 6 square feet of refractory wall surface to each square foot of catalyst tube surface, heating said reactants indirectly by introducing hot combustion gases into said heating zone substantially tangentially to said bank of tubes and at a plurality of vertically spaced points along and adjacent to said bank, withdrawing the treated reactants from adjacent the bottom of the tubes and withdrawing combustion gases at a point adjacent the top of said heating zone, whereby said hot combustion gases follow an upwardly ascending rotary path around said bank of tubes, which is thereby uniformly heated without substantial flame impingement thereon.

6. A process which comprises passing fluid reactants to be treated downwardly through elongate vertical tubes contained in a heating zone, simultaneously heating said reactants indirectly by introducing hot flaming gases into said heating zone at a plurality of vertically spaced points along and adjacent to said tubes and substantially tangentially to said tubes, and withdrawing the resulting combustion gases at a point adjacent the top of said zone, whereby said flaming gases follow an upwardly ascending rotary path around said tubes, which are thereby uniformly heated without substantial flame impingement thereon.

7. A process which comprises passing fluid reactants to be treated downwardly through elongate vertical catalyst tubes contained in a heating zone, heating said reactants indirectly by introducing hot combustion gases into said heating zone at a plurality of vertically spaced points along and adjacent to said tubes and substantially tangentially to said tubes, withdrawing the treated fluid from adjacent the bottom of the said tubes and withdrawing the combustion gases at a point adjacent the top of said heating zone, whereby said hot combustion gases follow an upwardly ascending rotary path around said tubes, which are thereby uniformly heated without substantial flame impingement thereon.

8. A process which comprises passing gaseous reactants to be treated downwardly through elongate vertical tubes contained in a heating zone, simultaneously heating said reactants indirectly by introducing hot flaming gases into said heating zone at a plurality of vertically spaced points along and adjacent to said tubes and substantially tangentially to said tubes, and withdrawing the resulting combustion gases at a point adjacent the top of said zone, whereby said flaming gases follow an upwardly ascending rotary path around said tubes, which are thereby uniformly heated without substantial flame impingement thereon.

9. A process which comprises passing gaseous reactants to be treated downwardly through elongate vertical catalyst tubes contained in a heating zone, heating said reactants indirectly by introducing hot combustion gases into said heating zone at a plurality of vertically spaced points along and adjacent to said tubes and substantially tangential'y to said tubes, withdrawing the treated gas from adjacent the bottom of the said tubes and withdrawing the combustion gases at a point adjacent the top of said heating zone, whereby said hot combustion gases follow an upwardly ascending rotary path around said tubes, which are thereby uniformly heated without substantial flame impingement thereon.

10. A process which comprises passing a mixture of gaseous reactants to be treated downwardly through elongate vertical tubes contained in a heating zone, simultaneously heating said reactants indirectly by introducing hot flaming gases into said heating zone at a plurality of vertically spaced points along and adjacent to said tubes and substantially tangentially to said tubes, and withdrawing the resulting combustion gases at a point adjacent the top of said zone, whereby said flaming gases follow an upwardly ascending rotary path around said tubes, which are thereby uniformly heated without substantial flame impingement thereon.

JAMES H. SHAPLEIGH.